United States Patent

Condon et al.

[15] 3,678,462

[45] July 18, 1972

[54] MEMORY FOR STORING PLURALITY OF VARIABLE LENGTH RECORDS

[72] Inventors: David C. Condon, Monte Sereno; Andrew J. Nichols, Palo Alto, both of Calif.

[73] Assignee: Novar Corporation, Mountain View, Calif.

[22] Filed: June 22, 1970

[21] Appl. No.: 48,145

[52] U.S. Cl. ....................340/172.5
[51] Int. Cl. ....................G06f 13/02
[58] Field of Search ....................340/172.5

[56] References Cited

UNITED STATES PATENTS

| | | | |
|---|---|---|---|
| 3,351,917 | 11/1967 | Shimabukuro | 340/172.5 |
| 3,368,203 | 2/1968 | Loizides | 340/172.5 |
| 3,462,411 | 8/1969 | Deskevich et al | 340/172.5 |
| 3,328,772 | 6/1967 | Oeters | 340/172.5 |
| 3,478,325 | 11/1969 | Oeters et al | 340/172.5 |
| 3,273,131 | 9/1966 | Strohm et al. | 340/172.5 |
| 3,289,171 | 11/1966 | Scherr et al | 340/172.5 |
| 3,333,252 | 7/1967 | Shimabukuro | 340/172.5 |

*Primary Examiner*—Paul J. Henon
*Assistant Examiner*—Sydney R. Chirlin
*Attorney*—Norman J. O'Malley, Theodore C. Jay, Jr. and John F. Lawler

[57] ABSTRACT

Memory apparatus for use with a data processing system having an electric typewriter input/ouput where the memory unit includes a delay line along with logic means which provide for dynamic allocation of memory space. In particular, this is provided by a particular data format with certain character flags and record markers.

10 Claims, 6 Drawing Figures

INVENTORS
DAVID C. CONDON
ANDREW J. NICHOLS
BY Flehr, Hohbach, Test, Albritton & Herbert
ATTORNEYS INVENTORS
DAVID C. CONDON
ANDREW J. NICHOLS
BY
Fitch, Hollach, Test, Albritton & Herbert
ATTORNEYS INVENTORS
DAVID C. CONDON
ANDREW J. NICHOLS
BY Flehr, Hohbach, Test, Albritton & Herbert
ATTORNEYS

MEMORY FOR STORING PLURALITY OF VARIABLE LENGTH RECORDS

BACKGROUND OF THE INVENTION

The present invention is directed in general to a memory and more particularly to a memory for storing a plurality of variable length records.

At the present time, data processing systems now include several different types of components which must communicate with each other and provide input and output data. One type of input/output device is the electric typewriter or teleprinter. Since the data entered from a typewriter keyboard consists of lines of type, the memory portion of a computer system should be compatible with this data format. In other words, the typist should not be delayed while data is being entered and at the same time the memory should not be overly complex or have excess capacity.

Present memory units have not specifically been adapted to interface with the data format of a typewriter; thus, they are complex and inefficient.

SUMMARY AND OBJECTS OF THE INVENTION

It is, therefore, an object of the present invention to provide improved memory apparatus.

It is another object of the invention to provide apparatus as above which is specially suited for interfacing with an electric typewriter.

In accordance with the above objects there is provided memory apparatus for storing a plurality of variable length records each record containing a variable number of characters and each character having a predetermined number of bits. This apparatus is comprised of circulating memory means for storing the records and having an input and an output. Shift register means are provided having a bit storage capability substantially less than the memory means but larger than the character length. The shift register is coupled to the input and output of the memory means and serves as a portion of the path for circulation of bits. Means coupled to the shift register modify predetermined bits of the first character of every record and mark each record with an indication of whether it is the oldest record in memory, the newest record in memory or between such statuses.

DETAILED DESCRIPTION OF THE PREFERRED EMBODIMENT

Figure 1:
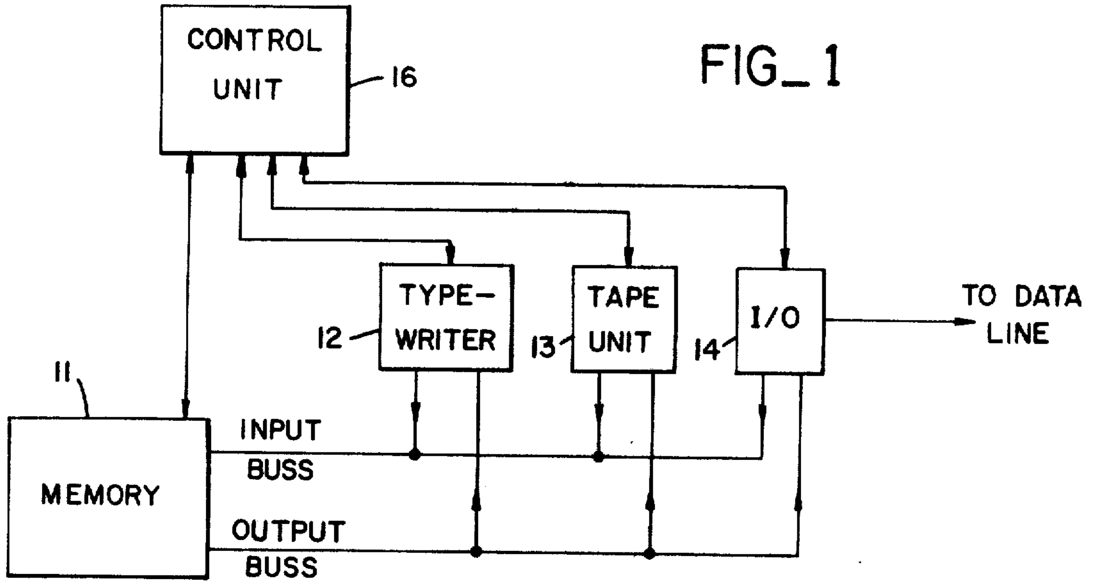
FIG. 1 is a block diagram of a computer system incorporating the memory apparatus of the present invention.

The overall environment of the memory apparatus of the present invention is shown in FIG. 1. A memory unit 11 has input buss and output buss which are coupled to three functional components: an electric typewriter 12, for example, of the IBM Selectric type or a teleprinter, a tape unit 13 and an input/ output device 14. All of these components can either read or write data. These are coupled to both the input buss and output buss of memory 11 and are under the overall control of a control unit 16 which is also coupled to memory 11.

The purpose of functional components 12, 13 and 14 is to receive data from the outside world and transmit such data to the memory 11. This is called a read operation. On the other hand, the functional units 12 - 14 can also take information from the memory and present it to the outside world; a write operation.

In the case of a read operation, the control unit 16 indicates which unit is to be the input unit to memory 11. If typewriter 12 is the functional input unit, its keyboard is unlocked and the logic of memory 11 then accepts the key strokes from the operator. In the case of tape unit 13, the data is received directly from a tape cartridge which would be inserted in the unit.

Input/output unit 14 is an interface unit for a data line which, for example, may be a telephone line to a remote computer terminal.

Control unit 16 causes the function component to stay in the read mode until it is determined that the record is complete. End of record is recognized with the tape unit when its inter-record gap is detected. End of record from input/output unit 14 is recognized when an end of transmission signal is received or a carriage return character is received.

In this specific case of typewriter 12, a line of type constitutes a record. The length of a line of type may of course vary from a few characters to a nominal full line containing 130 characters and to a greater number of characters than 130 due to overtyping. The end of the record is determined by the activation of the carriage return key of the typewriter by the operator.

In a write operation where one of the functional components 12– 14 is writing data from memory 11, the operation is analogous to read. When the functional component completes the writing of a record, it signals to the control unit and idles until the next record is ready to be written.

Typewriter 12 in addition to its carriage return indication of the completion of a record, includes two error correction controls which the operator may use. These are keys for deletion of a character which was recently entered by the typist and is found to be a mistake and deletion of an entire line of type where one or more mistakes may have occurred and the operator wishes to retype the entire line.

Figure 2:
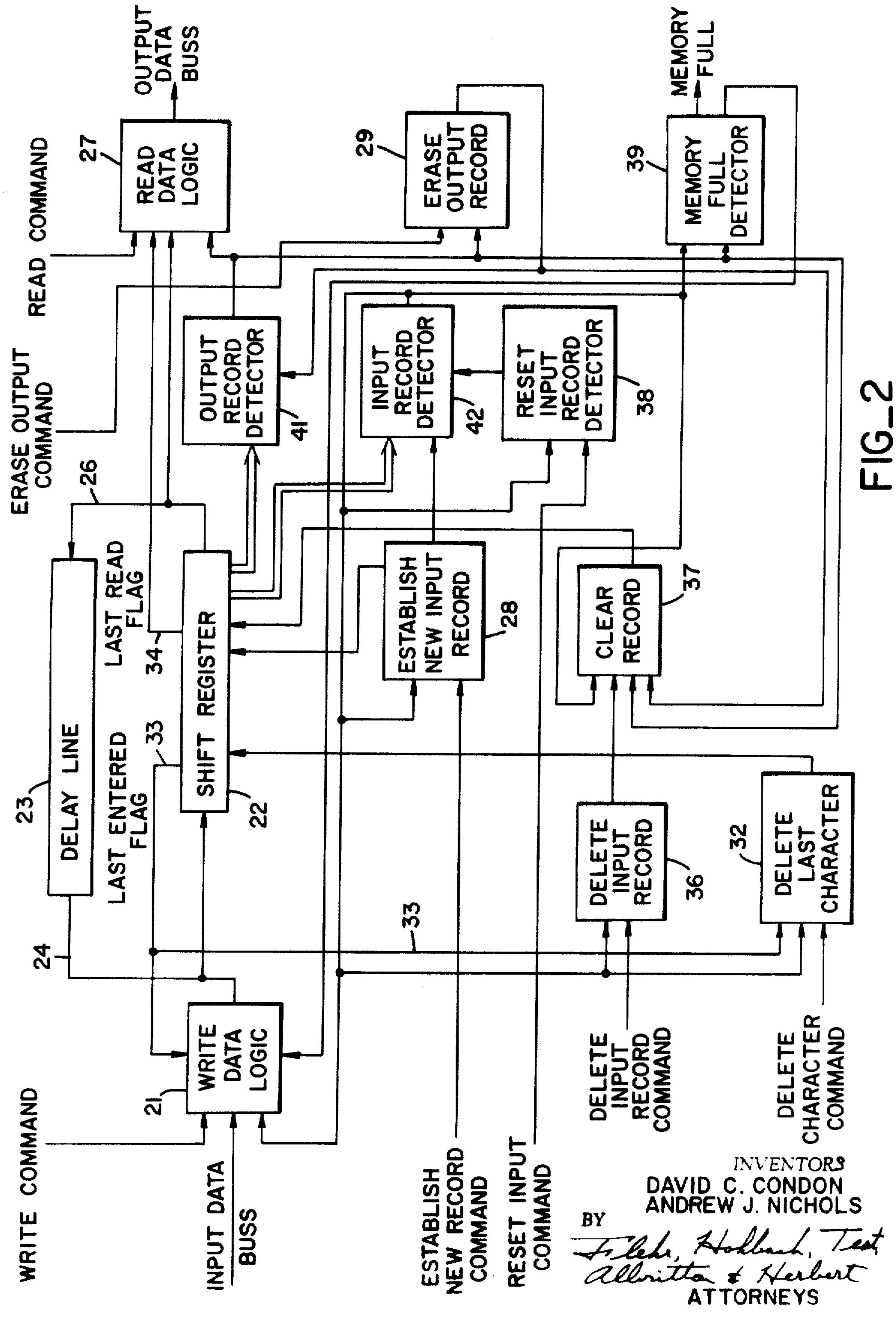
FIG. 2 is a detailed block diagram of the memory apparatus of FIG. 1.

Referring now to the FIG. 2, which is a detailed block diagram of memory unit 11 (FIG. 1), there is illustrated the input data buss and output data buss lines shown in FIG. 1. In addition, several command input lines are illustrated, such as the Delete Input Record command and the Delete Character command as discussed above in conjunction with the typewriter. These last two commands may, of course, be actuated by keys on the typewriter or by logic contained in control unit 16 which is responsive to commands from tape unit 13 or input/output unit 14.

The input data buss is coupled to a write data logic unit 21, which in turn is coupled to a shift register 22. This register 22 serves as a window, in effect, for the circulating memory or delay line 23. Such a delay line is capable of containing substantially 385 characters where each character consists of nine bits of data; block or record markers are also included. The delay line has an output 24 and an input 26 which are both coupled to shift register 22 to form a circulating path for the data contained in the delay line. Data is read out of a delay line via the shift register 22 by a read data logic device 27 which is coupled to the output data buss.

Figures 3A, 3B, 3C:
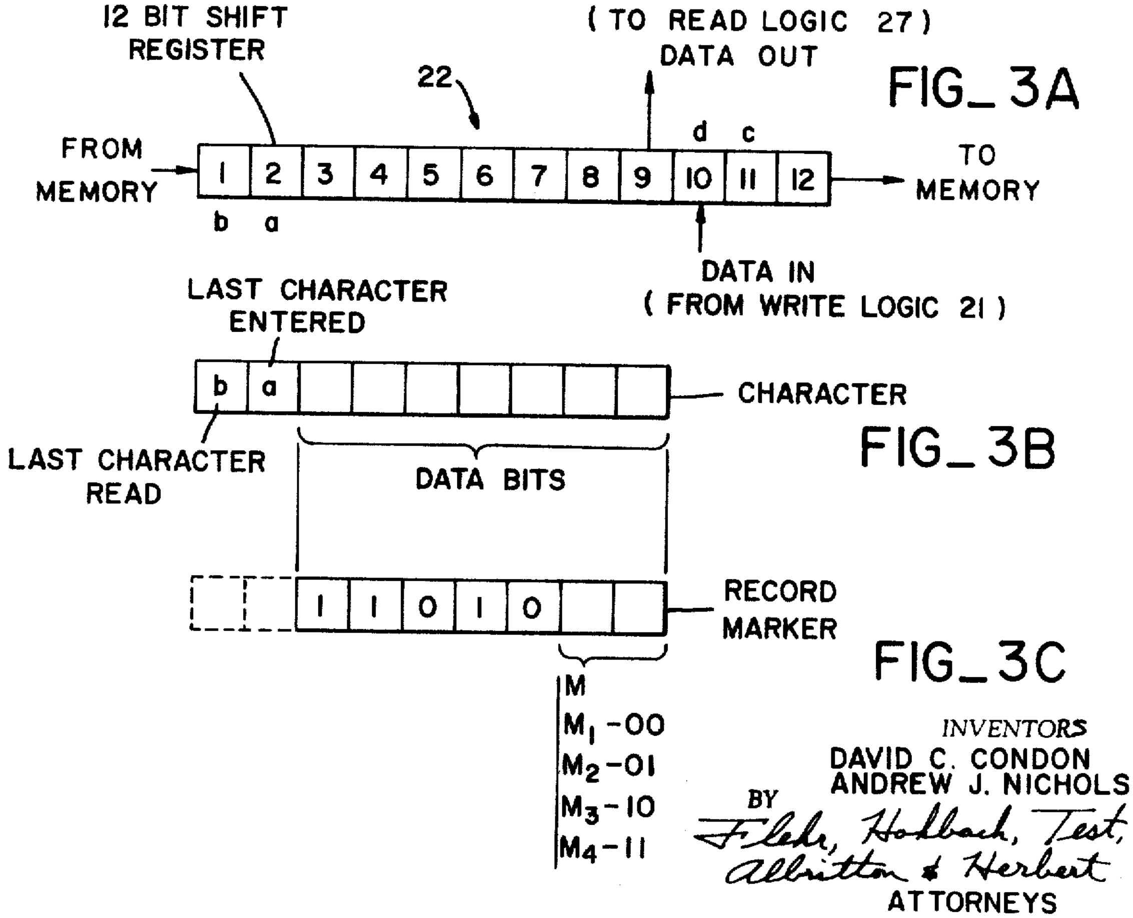
FIG. 3A is a diagrammatic representation of a shift register of FIG. 2.
FIG. 3B illustrates the format of a typical data character.
FIG. 3C illustrates the format of a record marker character.

The specific mode of connection of write data logic 21 and read data logic 27 to the shift register is illustrated in FIG. 3A where the shift register is shown to have a storage capability of 12 bits numbered 1 - 12. The input data from write logic 21 is placed in the shift register at the 10th bit and data is taken out of the memory by read logic 27 from the ninth bit. It is apparent that for economy purposes the bit storage capability of the shift register is substantially less than that of the memory or delay line 23. However, shift register 22 must have a bit capability larger than the character length which is nine bits in order to recognize certain markers and flags as will be explained in conjunction with FIGS. 3B and 3C.

The remaining functional components of the memory unit of FIG. 2 are for the purpose of executing the various commands of the functional components 12 - 14 and control unit 16. Specifically, a write command from the control unit 16 to write data logic 21 causes the delay line memory 23 to store a character in the next available record position of the delay line. In this specific embodiment, a record will contain the number of characters produced by a line of type of a typewriter. As discussed above the nominal maximum line contains 130 characters. However, since the average record will be much shorter, the delay line memory 23 can accept up to four records. The Read command line from control unit 16 and coupled to read data logic 27 causes delay line memory 23 to read out on the output data buss the next character available in the output record. Thus, it is apparent as will be described below, that the delay line contains an output record (OR) which is suitable for being read out, an input record (IR) which is in the process of being completed or written into the memory, and the intermediate records which have been completed but are not yet ready to be readout.

The system of record storage of the present invention is for the memory to accept data for storage and supply data on a first-in, first-out sequential basis. Thus, the oldest record in the memory is designated the output record (OR), and the newest record in memory is the input record (IR). In some cases where there is only one record, this is both the output and input record. Also, where the entire memory is desired to be cleared, the output record can be forced to also become the input record to facilitate clearance.

Still referring to FIG. 2, the Establish New Record command which is coupled to the establish new record logic unit 28 is normally instituted by the carriage return key of typewriter 12 when this is the data input unit. Any subsequent data entered into the memory 23 will be entered into this newest record.

The Erase Output command is coupled to the erase output record unit 29 which indicates to the memory that the data stored in the present output record is no longer required and may be destroyed. This would be the situation where the output record had just been readout on the output data buss.

The Delete Character command is coupled to the delete last character logic 32 which causes the last character to the input record to be deleted. One of the inputs to the delete last character logic unit 32 is a line 33 from the shift register 22 which is designated "last entered flag." Each data character as illustrated in FIG. 3B contains seven data bits and flags designated *a* and *b* which are for the purpose of showing that this character was either the last character entered, where the bit *a* would be in a 1 condition and *b* 0, or the last character read, where the bit *b* would be in a 1 condition and *a* 0. Thus, the unit 32 by this mode can recognize the last character entered flag in order to delete that character.

Similarly, on a line 34 a "last character read flag" is coupled to read data logic unit 27. This flag is entered by the read data logic unit 27 for the purpose of indicating the last character read for identifying the next character to be read.

Figure 4:
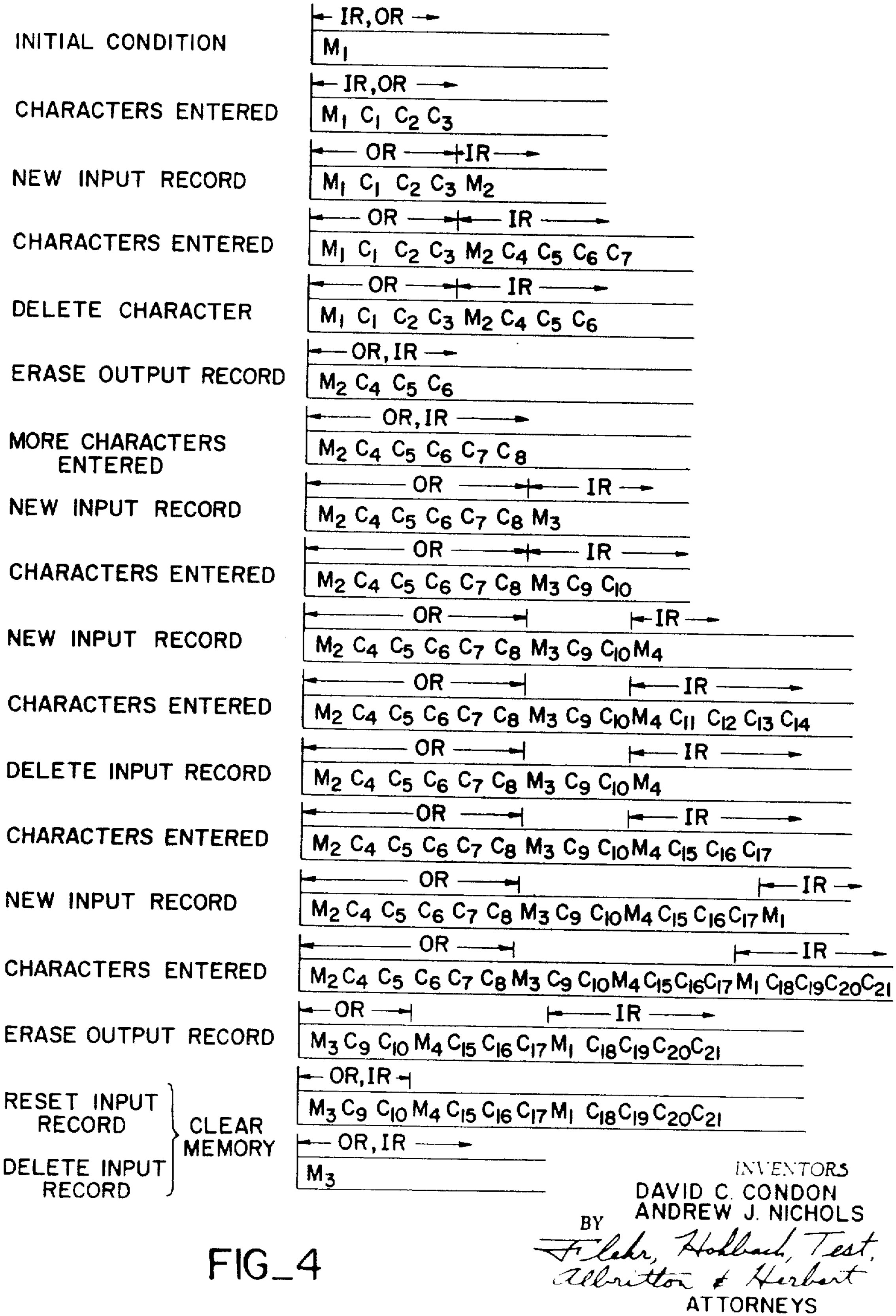
FIG. 4 is a table showing sample data sequences appearing in the memory apparatus of FIG. 2.

The Delete Input Record command is coupled to the logic unit 36 which in turn is coupled to a clear record unit 36 coupled to shift register 22.

Where it is desired to clear the entire memory a Reset Input command is coupled to reset input record detector unit 38 which causes the output record to now be designated the input record and in combination with the Delete Input Record command this, therefore, causes the entire memory to be cleared leaving only a single record marker as will be illustrated in FIG. 4.

When the memory is full, a memory full detection unit 39 provides a memory full indication to the write data logic unit 21 to prevent the input of data and in addition warns external functional devices via control unit 16 that the memory is full. The memory full indication may occur when, for example, a maximum of four records has been entered or the maximum of 385 characters has been entered. In the latter case, the memory full detection unit 39 is responsive to the time between the last character entered flag of the input record and a marker (which will be discussed below) shown in the output record (OR), being less than a predetermined minimum.

FIG. 3C illustrates the format of the character used for the record marker. The first two bits of the record marker designated M are used at the beginning of the marker to indicate the start of the record and the relationship of that record (or that line of type) to the other records. Thus, in the preferred embodiment where the memory may contain four records, the four records are designated $M_1$ through $M_4$ as illustrated in the drawing of FIG. 3C with the accompanying binary code 00, 01, 10 and 11, respectively. The remainder of the five bits of the record marker contains the code as indicated that this character is a record marker. The initial two bits M of the record marker are kept track of by logic units of FIG. 2 designated output record detector 41 and input record detector 42. The output record detector 41 senses the two marker bits and remembers which is the output record of all of the data records stored. Similarly, the input record detector remembers which is the input record. This is very simply accomplished by updating the input record detector 42 through the establish new input record unit 28. Thus, for example, if input record detector 42 were to contain a count of 00, when a new input record was established this would be sequenced to a count of 01 and so on. The same is true of output record detector 41 which essentially consists of a binary counter where when the output record is erased by erase output record unit 29, the detector is caused to count up 1 unit; for example, from 10 to 11. Thus, output record detector 41 and input record detector 42 are coupled to several other of the logic units to indicate the present input and output record.

In an alternative form, of course, it is not necessary that the markers $M_1$ through $M_4$ be in numerical order. Basically, it is only necessary to know the oldest and newest record present in the memory delay line 23, the intermediate records, and the records which consist of both input and output records at the same time. Thus, with the same logic system as shown an output record can be permanently designated 10, an input record 01, an intermediate record 00 and a record which is both input and output at the same time, 11.

FIG. 4 illustrates sample data sequences appearing in the delay line 23. In addition, these sequences indicate the many different operational modes of the present invention. M, of course, indicates a record marker which vary from 1 to 4 as discussed. C indicates a data character and OR and IR are an output record and input record respectively. The first line designated "initial condition" is where there is a provision for a record of data to be stored in the memory. All that is present is the record marker $M_1$. This, of course, is both the input record and output record. This continues to be the case as shown by the line designated "characters entered" where characters $C_1$, $C_2$ and $C_3$ have been added to the record. At this time assuming a typewriter was the input data source and a carriage return key activated, a new input record marker, $M_2$, would be entered as shown. The previous record would, therefore, now become the output record. Subsequent characters $C_4$ through $C_7$ could now be entered in the input record. If the typist committed an error, the delete character command on a typewriter could be pressed and the $C_7$ character deleted as indicated.

It if was now desired to erase the output record since, for example, it had been read and was no longer necessary, all of the characters of $C_1$ through $C_3$ and marker character $M_1$ would be erased making the prior input record the output record containing the marker character $M_2$ and the characters $C_4$, $C_5$ and $C_6$. More characters could then be entered; specifically, $C_7$ and $C_8$. The next data sequence again shows the start of a new input record where the marker $M_3$ has been entered and becomes the beginning of a new input record. Thus, if characters are entered, they would be $C_9$ and $C_{10}$. Yet another new input record $M_4$ is shown in the next step of the sequence. This causes the previous input record to now become merely an intermediate record as indicated by the marker $M_3$. The output record detector and input record detector 41 and 42 (FIG. 2) are, of course, keeping track of these changes as discussed. In the next data sequence, additional characters $C_{11}$ through $C_{14}$ are entered in the new input record. A Delete Input Record command will delete all of the newly entered characters $C_{11}$ through $C_{14}$ as illustrated leaving only the marker character $M_4$. Additional characters $C_{15}$, $C_{16}$ and $C_{17}$ can again be entered in the input record.

Another new input record can now be established which utilizes the marker $M_1$. Thus, it is apparent that the markers in the preferred embodiment are used in sequence. However, as discussed above permanent marker indications could easily be substituted.

In the next data sequence, characters $C_{18}$ through $C_{21}$ have been shown as entered into the input record. An Erase Output Record command erases the marker $M_2$ along with the characters $C_4$ through $C_8$ causing the next record in sequence to become the output record. This is indicated by the marker $M_3$.

If the entire memory is desired to be cleared this requires two steps. First, a Reset Input Record command given by the control unit causes the output record to now become the input record. Thereafter a Delete Input Record command erases the input record, leaving a marker $M_3$, and also erases all subsequent records.

The specific manner in which the flag bits and the start record marker character are used in the execution of memory commands are most readily discussed in conjunction with FIGS. 3A, 3B and 3C. The format of the data stored in the memory has an important effect on the manner in which the memory operates. The flag bits *a* and *b* illustrated in FIG. 3B are used for the entry and retrieval of data in lieu of address registers which are common in conventional memories. Normally, referring to FIG. 3A, when a character is in the 12 bit shift register it will fill the bits 1 through 9 of the register with *a,b* bits in bit locations 1 and 2 and either the data bits or the record marker bits in bit locations 3 through 9.

Where data is to be written into the memory, this occurs through the 10th bit *d*. Data entry would naturally occur immediately after the last character entered flag is sensed. Thus, when this flag is in the *c* or 11th bit position, the write data logic unit 21 causes this flag to be reset to 0 since it no longer will be the last character entered. The *a* bit is set to 1 and the *b* bit is set to 0 to give the proper designation to the character to be entered. The seven data bits of the next character are then sequentially read in for seven shifts or clock periods. These data bits of the character are, of course, appended to the *a* and *b* flag bits which were previously entered.

When data is outputed or read from the memory the last character read flag must be in the *d* position. In other words, the next character to be read will now be in the positions 3 through 9. At that time the *d* character is set to 0 and the *b* to 1 to indicate that this character will now be the last character read. The character is then outputed through bit 9 to read logic unit 27.

Where the last character is to be deleted the last character entered flag is sensed in the *a* position indicating that the remainder of its data bits are in the 3 through 9 positions. At that time, the *c* bit is set to 1 in order to provide the last character entered flag on the previously entered character which would now be the last character entered. Data in positions 1 through 9 are now cleared to 0.

Where an input record is to be cleared or a new input record established, the record marker bit M must be sensed. In general, the input record is cleared by sensing the input record marker which is, of course, done by the input record detector 42. The clear record unit 37 as shown in FIG. 2 is responsive to the output of the input record detector 42 to clear the record until output record detector 41 detects the output record marker. This detector is, of course, also coupled to clear record unit 37. More specifically, after the input record marker has passed through the ninth bit the clear record unit 37 inhibits the transfer of data into the *d* position by continually forcing *d* to 0 until the output record marker occurs in the register positions 1 through 9.

Where a new input record is established, this is a three step process. First, when the last character of the present input record is in the positions 1 through 9 this is sensed by the establish new input record unit 28. Seven clock periods later the input record detector 42 is advanced one count. This is because the new input record, of course, will be one count more than the previous input record. Thirdly, at the end of the first full character time which is 9 bits, a new input record marker is set into the positions 1 through 9 with the bits 8 and 9 which constitute the M portion of the record marker, being set to designate an input record by input record detector 42.

An Erase Output Record command advances the output record detector 41 one count since the new output record will now be the next stored record. When the present output record is in register positions 1 through 9, zeroes are forced into position *d* by the action of clear record unit 37 until the new output record marker is in the register portions 1 through 9.

Lastly, when it is desired to clear the memory as discussed above and illustrated in FIG. 4, a Reset Input command from the operator of the control unit causes the input record detector 42 to be advanced in count until it is equal to the output record detector 41. This is caused by the reset input record detector 38. The clear record unit 37 under the Delete Input Record command then clears all characters until the output record marker character reaches positions 1 through 9. This is, of course, the same as the input record marker. Thus, all characters are cleared.

Thus, the present invention provides improved memory apparatus which in effect has the capability of dynamically allocating memory space. While providing economy by providing a circulating memory having a maximum of 385 characters, it at the same time allows any single record to contain up to this number of characters for any given single record. However, up to four smaller records may also be stored. This is especially beneficial in the case of a typewriter input where frequently the records will contain much less than this number of characters. For example, the majority of records probably contain between 40 and 100 characters. Thus, the present invention efficiently utilizes memory space by the foregoing dynamic allocation.

We claim:

1. Memory apparatus for storing a plurality of variable length records each record containing a variable number of characters and each character having a predetermined number of bits said apparatus comprising: circulating memory means for storing said records and having an input and output; shift register means having a bit storage capability substantially less than said memory means but larger than said character length and coupled to said input and output of said memory means and serving as a portion of the path for the circulation of bits; means coupled to said shift register for modifying at least one predetermined bit of the first character of every record for marking the record with an indication of whether it is the oldest record in memory, the newest record in memory or between said statuses.

2. Memory apparatus as in claim 1 together with erasure means responsive to deletion of a record from memory to reflect the changed status of the oldest record.

3. Apparatus as in claim 1 together with means for flagging characters in said memory means to show the last character entered into and the last character read out from said memory means.

4. Apparatus as in claim 3 together with means responsive to the time between the last character entered flag of the newest record and the marker for oldest record being less than a predetermined minimum for indicating said memory means is full.

5. Apparatus as in claim 3 with means for reading out data only where an oldest record is indicated.

6. Apparatus as in claim 3 together with means for deleting the last character entered in said newest record.

7. Apparatus as in claim 3 together with means for entering new characters into the newest record.

8. Apparatus as in claim 1 in which means are provided for clearing said memory means leaving only a record marker with no data characters.

9. Apparatus as in claim 1 together with electric typewriter means coupled to said shift register means said typewriter including a carriage return key said memory apparatus including means responsive to activation of such key for establishing a new record.

10. Apparatus as in claim 1 together with means for deleting said newest record.

* * * * *